United States Patent [19]
Ravel

[11] 3,810,420
[45] May 14, 1974

[54] MACHINES FOR THE MANUFACTURE OF PLASTIC BAGS

[75] Inventor: Léon Ravel, Sainte-Sigolene, France

[73] Assignee: Georges Lagain, Argenteuil, France

[22] Filed: Apr. 10, 1973

[21] Appl. No.: 349,735

[30] Foreign Application Priority Data
Apr. 11, 1972  France .............................. 72.13669

[52] U.S. Cl. .................. 93/93 HT, 93/26, 93/33 H, 93/DIG. 1, 93/8 R, 156/583
[51] Int. Cl. ............................ B31b 1/64, B31b 1/98
[58] Field of Search ............. 93/33 H, 93 HT, 93 R, 93/DIG. 1, 8 R, 26; 156/583, 290

[56] References Cited
UNITED STATES PATENTS

3,587,410  6/1971  Dechanciaux ...................... 93/33 H
3,287,195  11/1966  Piazze .............................. 93/DIG. 1

*Primary Examiner*—Milton S. Mehr
*Assistant Examiner*—James F. Coan
*Attorney, Agent, or Firm*—Clelle W. Upchurch

[57] ABSTRACT

A bag making machine for making plastic bags, gussetted or non-gussetted, from lay-flat plastics tubing in which the tubing is sealed and cut into bags and stacked on a pivotable platform by being clamped under an extension of the lower sealing jaw. This jaw extension has a sealing electrode energized to seal the various bags of the stack to one another.

5 Claims, 7 Drawing Figures

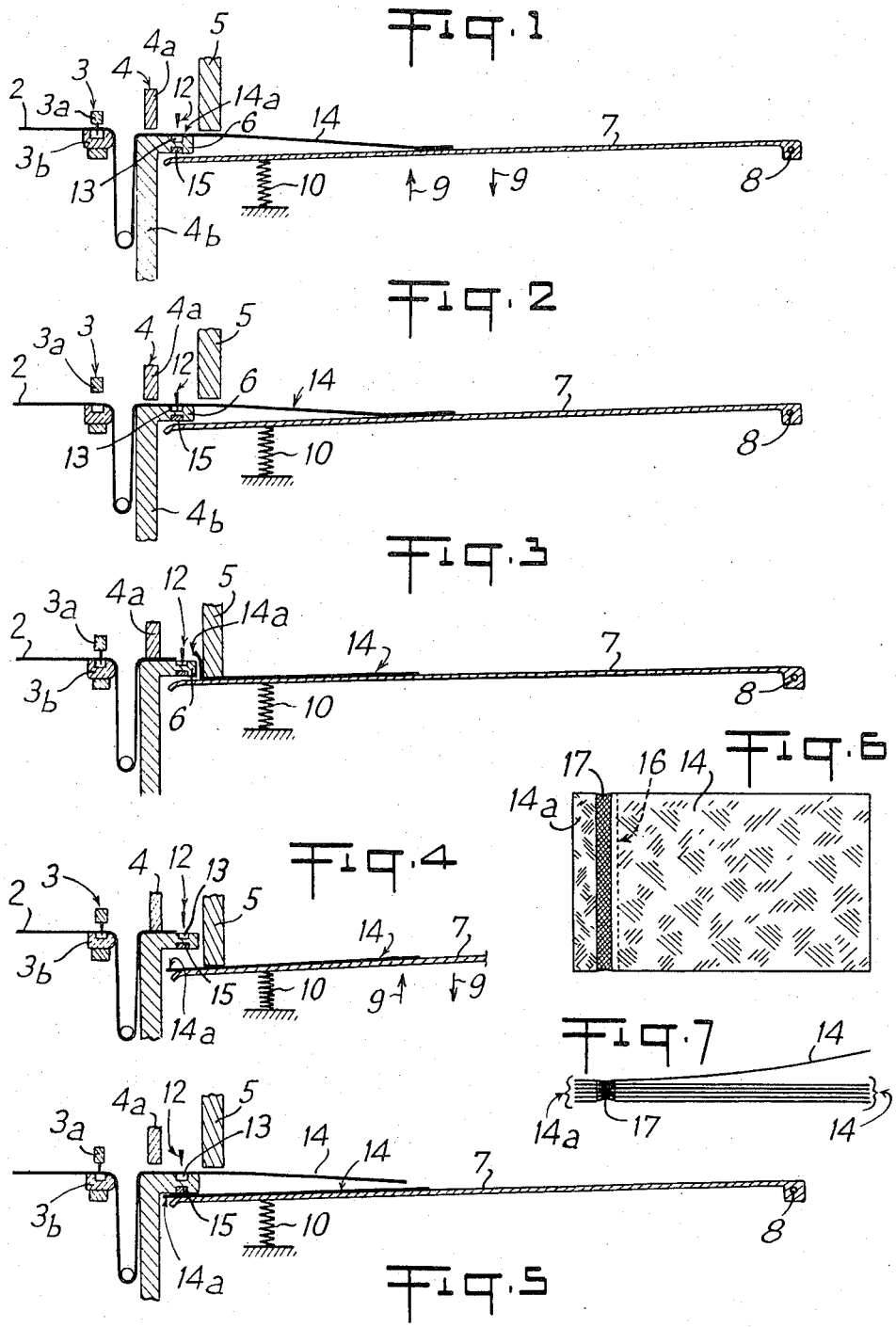

MACHINES FOR THE MANUFACTURE OF PLASTIC BAGS

The invention relates to an improvement in machines for the manufacture of bags from a lay-flat tubing of heat-sealable plastic.

It relates more particularly to machines of the type of those which comprise, in the running direction, means for cyclically displacing the lay-flat tubing longitudinally, two transverse sealing jaws of which the lower is fixed and has a front extension, means for severing each manufactured bag, a disengagement jaw which exerts a vertical push on each manufactured bag bringing the free end of this bag to below the lower face of the front extension of the fixed jaw, and a platform hinged to swing downwards under the action of the disengagement jaw with its rear end located below the front extension of the fixed lower sealing jaw and biased towards this extension to immobilize the manufactured bags by a pinching action.

Traditionally, bags manufactured by this type of machine are stocked by pinching between the hinged platform and the front extension of the lower sealing jaw until they form a stack of a given number of bags whereupon they are withdrawn from the machine and then bundled, that is to say joined together by appropriate means to form a bundle which can be hung up and from which bags can be removed one by one. Currently this bundling is effected manually and consists of clipping a U-shaped profile, for example of cardboard across that end of the packet which corresponds to the openings of the bags.

This procedure requires time and manual work and increases the cost price of the bundle of bags.

Machines currently exist which simultaneously manufacture and bundle bags. However, since in order to ensure automatic bundling it is necessary for the bags to travel transversely in their width direction and not longitudinally as in the machines of the abovementioned type, such an automatic bundling machine can only manufacture non-gussetted bags.

The object of the improvement according to the present invention is to permit the automatic formation of bundles of bags immediately after the manufacture of the bags, regardless of whether they are of the gussetted type.

The improvement of the present invention is characterised by a sealing electrode projecting from the lower face of the said front extension of the fixed transverse sealing jaw so as to ensure that when the platform returns to its initial position the end of each manufactured bag is joined to those of the bags stocked on the platform.

Thus, when in use of the machine, the bag is brought under the front extension of the fixed sealing jaw, it is automatically joined to the bags resting on the platform by virtue of the biasing means of the platform, bringing the end of this bag at or near the open mouthed end up against the said sealing electrode.

Advantageously, the sealing electrode is only energized while the sealing jaws and disengagement jaws are rising.

Thus, when during raising of the movable sealing jaw and the movable disengagement jaw, the last manufactured bag is brought up against the front extension of the sealing jaw it is immediately joined to the bag below it. It is obvious that the period for which the electrode is energized depends on the thickness of the film forming the tubing but is in all cases less than the time required for the jaws to rise.

The invention will be better understood with the aid of the following description relating to the attached schematic drawing which represents, by way of a non-limiting example, a machine which includes the application of the improvement according to the invention:

FIGS. 1 to 5 are longitudinal sections which schematically show the principle operating components of the machine during the various stages of manufacture of a bag.

FIGS. 6 and 7, are respectively, a top plan view and side elevation view showing the bundle of bags produced by this machine.

In FIGS. 1 to 5, a heat-sealable lay-flat plastic tubing 2 is cyclically unwound from a roll, not shown, and passes successively between perforating jaws 3 and sealing jaws 4 and under a disengagement jaw 5.

The perforating jaws 3 consist of a movable upper jaw 3a having a series of vertical spikes and a co-operating fixed lower jaw 3b. The transverse sealing jaws consist of a movable upper jaw 4a carrying a sealing electrode (not shown) and a fixed lower jaw 4b which has an integral front extension 6 projecting towards the front of the machine and above the rear end of a platform 7 whose front end is hinged on a horizontal spindle 8. As a consequence, the platform 7 can pivot in the direction of the arrows 9, under the action of the disengagement jaw 5 on the one hand, and under the action of the schematically illustrated return biasing means 10 on the other hand.

In a known manner, the lay-flat tubing 2 first is perforated along a transverse line by the spikes of the jaw 3a (FIG. 1) and then advances cyclically by a given distance so as to arrive between the sealing jaws 4a and 4b. As is shown in FIG. 2, simultaneously with the transverse sealing action which closes the bottom of the bag 14, this bag is detached from the next preceding bag by a knife 12 located between the movable upper sealing jaw 4a and the disengagement jaw 5.

This knife 12 is in the form of a cutting blade fixed to an endless cable passing around two reciprocatably rotatable pulleys, which cause it to describe a horizontal path during which it cooperates with a groove 13 machined in the lower sealing jaw extension 6 so as to cut the tubing and sever the two bags one from another.

After cutting, and whilst the transverse seal of another bag is being made, the open mouthed end 14a of the bag 14 thus manufactured is carried down onto the platform 7 by the descent of the disengagement jaw 5, as is shown in FIG. 3. Towards the end of its travel, the disengagement jaw 5 comes into contact with the platform 7 and causes it to swing downwards as shown in FIG. 4. As a result, the open mouthed end 14a of the bag 14, after having been deformed, slides between the opposed faces of the jaw extension 6 and the disengagement jaw 5 to lie in the plane of the main part of the bag disposed on the platform 7.

In the next phase, shown in FIG. 5 and corresponding to raising of the jaws 4a and 5, the platform 7 swings back upwardly to resume its initial position and, by co-operating with the lower face of the extension 6, pinches the open mouthed end 14a of the just severed bag 14.

As a result, the bags 14 are stored in a stack on the platform 7 at the rate at which they are manufactured until the stack height corresponds to a given number of bags.

The underside extension 6 of the jaw 4b is provided with a second sealing electrode 15 so as to project downwardly from the latter. This electrode is electrically connected to means which cause it to be energized only during the phase when the upper sealing jaw 4a and the disengagement jaw 5, are rising. Thus, each time the platform 7 rises to its initial horizontal position and lays the open mouthed end 14a of the last manufactured bag under the jaw extension 6, this end 14a comes into contact with the electrode 15 which joins it, by sealing, to the ends of the bags already resting on the platform 7.

The resulting wad of bags is as shown in FIGS. 6 and 7, namely a bundle in which each of the bags 14 is provided with a perforation line 16 joining it to a holding member formed by a transverse seal 17 made at the mouth ends 14a of the various bags.

It should be noted that this method of bundling can be used for any type of bag which may or may not possess lateral gussets. Finally, due to their being joined by sealing, the bags of a given bundle are perfectly connected to one another whilst being easily detachable by tearing along the perforation line.

I claim:

1. In a machine for the manufacture of plastic bags from a lay-flat tubing of the type comprising means for longitudinally and cyclically displacing the lay-flat tubing, two transverse sealing jaws, of which the lower is fixed and has a front extension, means for cutting off each manufactured bag, a disengagement jaw which exerts a downward push on each manufactured bag bringing the free end of this bag to below the lower face of the front extension of the fixed jaw, and a platform which is hinged for swinging downwards under the action of the disengagement jaw and has its rear end located below the said front extension and biased upwardly thereagainst to immobilize the manufactured bags by a pinching action, the improvement comprising a sealing electrode projecting from the lower face of the said front extension of the fixed transverse sealing jaw and means for energizing said electrode to seal each manufactured bag to any other bags already stocked on the platform when the platform returns to its initial position.

2. The improvement of claim 1, wherein said energizing means is adapted to energize the sealing electrode only while the sealing and disengagement jaws are rising.

3. The improvement of claim 1, further including a perforator means for forming a transversely extending perforation line across each bag.

4. The improvement of claim 3, wherein said perforator means is located ahead of said sealing jaws.

5. The improvement of claim 3, wherein said perforator means comprise a movable perforator jaw, perforator pins on said movable perforator jaw and a fixed perforator jaw co-operable with said perforator jaw and pins.

* * * * *